Oct. 29, 1929.  A. H. DAVIS, JR  1,733,250
ELECTRICAL HEATING
Filed Nov. 6, 1925
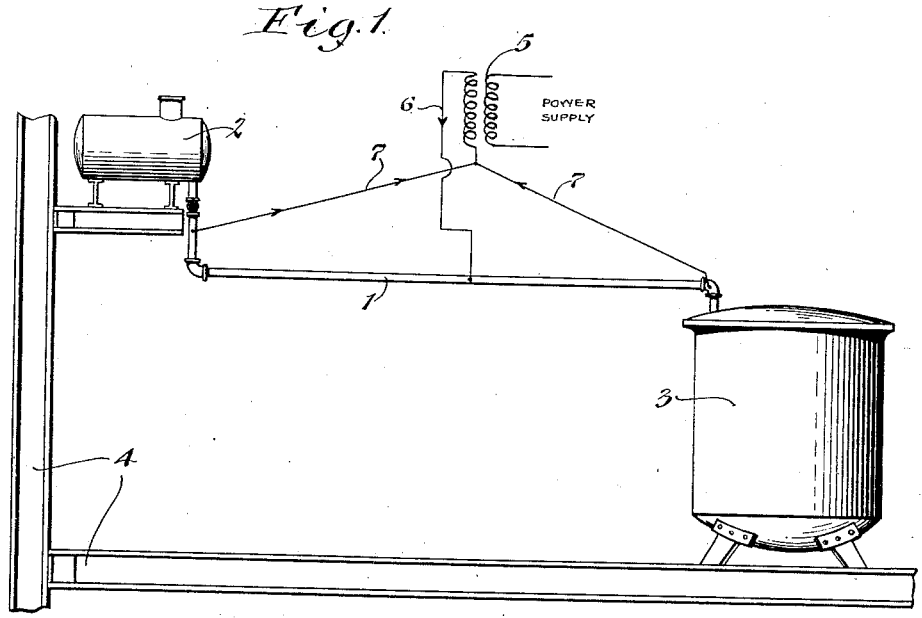
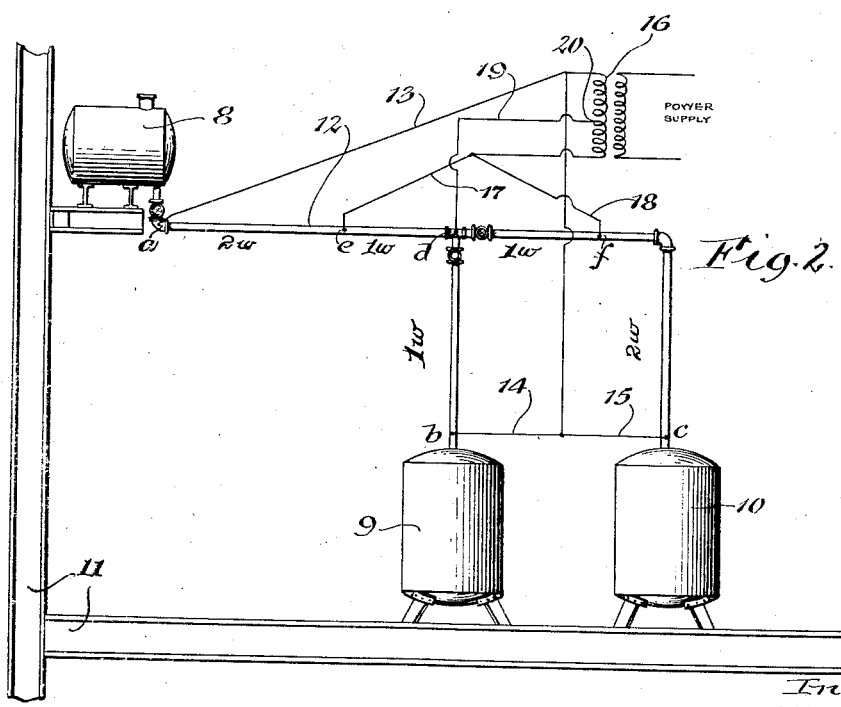
Inventor
A. H. DAVIS, JR.
by William J. Karslake
Attorney Patented Oct. 29, 1929

1,733,250

UNITED STATES PATENT OFFICE

ARCHIBALD H. DAVIS, JR., OF BUFFALO, NEW YORK, ASSIGNOR TO NATIONAL ANILINE AND CHEMICAL CO., INC., OF NEW YORK, N. Y., A CORPORATION OF NEW YORK

ELECTRICAL HEATING

Application filed November 6, 1925. Serial No. 67,296.

This invention relates to electrical heating and in particular to electrical heating of pipe lines connecting electrically uninsulated apparatus.

For conveying substances that tend to solidify at ordinary temperatures, it is necessary that the pipe line conveying such material be heated to maintain a fluid condition. The usual method of employing gas burners involves uneven heating and risk of overheating, and is distinctly hazardous. Accordingly heating with electric current is desirable; but, as a pipe line, when connected to apparatus, cannot be readily insulated, usually other paths for the flow of current exist in addition to the pipe line in parallel conductive relationship therewith. The result is that current follows the other paths, and these stray currents may be large compared with the effective current through the pipe line. Current is consequently wasted in heat, where it is not needed or wanted.

It is an object of my invention to provide electrical heating means for a pipe line or a similar body having electrically uninsulated connections. Another object is the heating of a pipe line or a body by electric current where stray paths for current exist by causing a flow of current in the pipe line or body while substantially avoiding the flow of current in the stray paths.

These and other objects I accomplish by connecting the ends of the pipe line to one terminal of a source of current, and the other terminal of the current source to a point or points intermediate the ends. The current is thus divided into branches through the pipe line, and there can be no appreciable flow of current through other paths between the pipe ends, since there is no material difference of potential to cause the flow.

In the drawing, Fig. 1 diagrammatically illustrates a pipe line associating two pieces of apparatus and a circuit including the pipe line.

Fig. 2 is a diagrammatic illustration of a pipe line connecting a plurality of pieces of apparatus and the heating circuit.

In Fig. 1, a pipe line 1 connects a blow case 2 and a fusion pot 3. As these structures are carried on the frame of the building which, as a rule, consists of steel members 4, it is evident that a path for electric current from the pipe exists through the structures and the building as well as through the pipe. Such stray currents are avoided by connecting both ends of the pipe line 1 to one terminal of the transformer 5 by two conductors or leads 7. The other terminal of the transformer 5 is connected through a lead 6 to a point midway of the pipe ends. With a midway connection of the lead 6, the pipe is substantially uniformly heated throughout its length; but the lead 6 may be connected at any point intermediate the ends of the pipe line, if uniform heating is not necessary.

When the pipe line connects more than two pieces of apparatus, the principle is also applicable. Fig. 2 shows a system consisting of three pieces 8, 9 and 10 on a conductive framework 11 connected by a pipe line 12 to be heated. Leads 13, 14 and 15 connect one terminal of a transformer 16 to the pipe line ends $a$, $b$, $c$, and leads 17 and 18 extend from the other terminal of the transformer to intermediate points $e$, $f$ of the pipe line. Assuming that the leads to the pipe line have negligible resistance and the pipe line has, for example, the resistances thereon indicated in the figure, it is not feasible to connect one terminal from the source to the pipe ends, $a$, $b$, $c$, and the other to the midpoint $d$, because the current flow through the section $d$, $b$, having one third of the resistance, will be three times as great. To overcome this, when uniform heating is required, the second terminal is connected to points, such as $e$ and $f$, which delimit sections of the pipe line extending from the pieces of apparatus into units of substantially equal resistance. However, where the connection of a section extending from a piece of apparatus to the pipe line, as point $d$, is intermediate such points, two returns in parallel exist from such a point $d$ to the adjacent terminal connections, $e$ and $f$, and the current is consequently divided between them. To correct this condition, the point $d$ is connected by a lead 19 to a tap 20, so located on the source that a potential is applied across each return sufficient to secure a full current flow.

With additional pieces of apparatus, connections are made, as illustrated and explained with regard to Fig. 2. It can thus be extended, to heat with substantial uniformity, pipe lines connecting any desired number of pieces of apparatus that are grounded without perceptible leakage.

The system disclosed is susceptible of various modifications. Taps on the source whereby the voltage is divided to give the desired RI drop in any section of the pipe lines can be used, and points of like potential can be associated by common leads.

While the invention is disclosed in its application to pipe lines, it is evident that it has other uses and is not to be restricted thereto.

I claim:

1. A method of electrically heating a plurality of interconnected sections which comprises maintaining substantially equal potential on the ends of said sections, imposing a different potential at points of substantially equal resistance measured from such ends, and applying proportionate potential at intermediate points defining sections connected in parallel to cause a substantially uniform current within all of the sections.

2. A system for electrically heating a body having a path capable of conducting current in parallel conductive relationship therewith comprising a source of current, leads from one terminal of said source to the ends of the body, and a lead from the other terminal of said source to a point intermediate the ends of the body.

3. A system for electrically heating a pipe line having sections connected to a plurality of pieces of apparatus and having paths capable of conducting current in parallel conductive relationship therewith, said system comprising a source of current, leads from one terminal of said source to section ends attached to the apparatus, and leads from the other terminal of said source to points in the pipe line intermediate the sections.

4. A system for electrically heating a pipe line having sections connected to a plurality of pieces of apparatus, said system comprising a source of current, leads from one terminal of said source to section ends attached to the apparatus, leads from the other terminal of said source to points in the pipe line delimiting sections having substantially the same resistance, and leads tapped from said source to interconnections defining sections of different conductivity for applying proportionate potentials.

5. A system for electrically heating a pipe line having sections connected to a plurality of pieces of apparatus, said system comprising a source of current, leads from one terminal of said source to section ends attached to the apparatus, leads from the other terminal of said source to points in the pipe line delimiting sections having substantially the same resistance, and leads tapped from said source to portions of the pipe line connected in parallel for applying potential to said portions to cause a uniform current flow.

6. A method of electrically heating a body having a path capable of conducting current in parallel conductive relationship therewith which comprises maintaining the ends of the body at substantially equal potential and imposing a different potential intermediate the ends to cause a flow of current in said body while substantially avoiding the flow of current through said path.

7. A method of electrically heating a body of substantially uniform linear resistance having a path capable of conducting current in parallel conductive relationship therewith which comprises applying substantially equal potential at the ends and a different potential midway of the ends of said body to cause a flow of current in said body while substantially avoiding the flow of current through said path.

8. A method of electrically heating a plurality of bodies having an end of each connected with the other bodies and having a path capable of conducting current in parallel conductive relationship therewith which comprises maintaining substantially equal potential on the unconnected ends of said bodies and imposing a different potential at a point intermediate the unconnected ends of said bodies to cause a flow of current in said bodies while substantially avoiding the flow of current through said path.

In testimony whereof I affix my signature.

ARCHIBALD H. DAVIS, Jr.